(12) United States Patent
Berger et al.

(10) Patent No.: US 8,425,856 B2
(45) Date of Patent: Apr. 23, 2013

(54) DEVICE FOR PRODUCING STARTING MATERIALS, COMBUSTIBLE SUBSTANCES AND FUELS FROM ORGANIC SUBSTANCES

(75) Inventors: Uwe Berger, Friedewald (DE); Thomas Willner, Hamburg (DE); Walter Vanselow, Eichenkratt (DE)

(73) Assignee: Technische Werke Ludwigshafen AG, Ludwigshafen (DE)

( * ) Notice: Subject to any disclaimer, the term of this patent is extended or adjusted under 35 U.S.C. 154(b) by 0 days.

(21) Appl. No.: 12/989,254

(22) PCT Filed: Apr. 24, 2009

(86) PCT No.: PCT/EP2009/003024
§ 371 (c)(1), (2), (4) Date: May 12, 2011

(87) PCT Pub. No.: WO2009/130047
PCT Pub. Date: Oct. 29, 2009

(65) Prior Publication Data
US 2011/0212000 A1    Sep. 1, 2011

(30) Foreign Application Priority Data
Apr. 25, 2008 (DE) .......................... 10 2008 021 629

(51) Int. Cl.
*B01J 3/00* (2006.01)
*B01J 19/00* (2006.01)
*B01J 8/00* (2006.01)
*B01J 8/18* (2006.01)
*F27B 15/00* (2006.01)

(52) U.S. Cl.
USPC ........... 422/242; 422/129; 422/131; 422/138; 422/139; 422/187

(58) Field of Classification Search .................. 422/129, 422/131, 138, 139, 242, 187
See application file for complete search history.

(56) References Cited

U.S. PATENT DOCUMENTS

| 2,560,403 | A |   | 7/1951 | Arveson |
| 4,075,083 | A | * | 2/1978 | Putman .......................... 208/407 |
| 4,108,759 | A |   | 8/1978 | Young |
| 4,466,360 | A | * | 8/1984 | Shang et al. ................... 110/264 |
| 4,569,696 | A | * | 2/1986 | Sandstrom et al. ............... 134/2 |

(Continued)

FOREIGN PATENT DOCUMENTS

| DE | 31 15 110 | 2/1982 |
| DE | 20311414 U1 * | 10/2003 |

(Continued)

OTHER PUBLICATIONS

Machine tramslation of EP 10571 A, which was published May 14, 1980.*

*Primary Examiner* — Walter D Griffin
*Assistant Examiner* — Natasha Young
(74) *Attorney, Agent, or Firm* — Fay Sharpe LLP

(57) ABSTRACT

The invention relates to a device for producing starting materials, combustible substances and fuels from organic substances. Said claimed device comprises a reactor (10) that comprises an introduction device (11) for the organic substances, an evacuation device (12) for the reaction products and a device (13) for feeding reaction energy for the transformation of organic substances into reaction products. The invention is characterized in that the introduction device (11) comprises pneumatic means (24) for the supply of solid material.

10 Claims, 5 Drawing Sheets

U.S. PATENT DOCUMENTS

| | | | |
|---|---|---|---|
| 4,662,799 A * | 5/1987 | Paul et al. | 406/14 |
| 5,688,910 A * | 11/1997 | Wang | 528/483 |
| 5,849,964 A | 12/1998 | Holighaus | |
| 2005/0283010 A1* | 12/2005 | Chordia et al. | 554/11 |
| 2006/0151053 A1* | 7/2006 | Boroch et al. | 141/83 |
| 2008/0103323 A1* | 5/2008 | Cromer et al. | 556/470 |

FOREIGN PATENT DOCUMENTS

| | | |
|---|---|---|
| EP | 10571 A * | 5/1980 |
| EP | 0 372 761 | 6/1990 |
| EP | 0 692 009 | 1/1996 |
| GB | 891 648 A | 3/1962 |
| GB | 1 183 451 A | 3/1970 |
| GB | 1 417 464 | 12/1975 |
| GB | 2 074 185 A | 10/1981 |
| GB | 2 095 391 A | 9/1982 |
| RU | 2 054 163 C1 | 2/1996 |
| RU | 70843 U1 * | 2/2008 |
| WO | WO 2004/085578 | 10/2004 |

* cited by examiner

DEVICE FOR PRODUCING STARTING MATERIALS, COMBUSTIBLE SUBSTANCES AND FUELS FROM ORGANIC SUBSTANCES

The invention relates to a device for producing starting materials, combustibles and fuels from organic substances. A device which has the features of the preamble of claim 1 is known, for example from DE 102 15 679 A1.

A method for the direct thermochemical conversion of high-molecular weight organic substances into high-grade low-molecular weight organic products which are present as low-viscosity liquids at room temperature and are combustible is known. In this method, organic substances in the form of preferably solid, renewable starting materials and/or residual substances are converted by direct liquefaction into highly refined liquid hydrocarbons with the objective of using these products chemically and energetically. This known method is mainly suitable for the production of fuels for conventional motor vehicles, i.e. for the production of petrol or diesel.

The method disclosed in DE 102 15 679 A1 for direct liquefaction is a catalytic-thermal conversion process, in which high-grade, liquid products are produced from high-molecular weight organic substances by crack and refining reactions, assisted by catalysts, in a direct manner, i.e. without a diversion via gasification.

To feed organic substances into the reactor, mechanical feed systems are generally used, such as, for example, screw conveyors, piston machines or other sluice systems. The screw conveyors and the piston machines have the drawback that the solid particles of the organic substances are compacted and accordingly can only be separated or released poorly, or only with effort, in the reactor. In the case of piston machines, there is also the requirement for the addition of slurry liquid, additional measures optionally having to be taken to heat up or preheat the slurry liquid, so that no undesired temperature losses occur by feeding the slurry liquid into the reactor. Sluice systems have the drawback that the solid materials drop onto the liquid surface and not sufficiently rapidly mixed into the interior of the sump phase.

The invention is based on the object of providing a device for producing starting materials, combustibles and fuels from organic substances, which allows an efficient supply of the organic materials into the reactor.

This object is achieved according to the invention by a device having the features of claim 1.

An important point of the invention is to disclose a device for producing starting materials, combustibles and fuels from organic substances, which has a reactor with a feed arrangement for the organic substances and a discharge arrangement for reaction products. The reactor also comprises an arrangement for feeding reaction energy for the conversion of the organic substances into the reaction products. The feed arrangement has, according to the invention, a pneumatic means for supplying solid material.

The pneumatic supply of solid material has the advantage that the supplied solid material particles do not arrive in compacted form in the reactor, but can instead be fed in fluidised form, so a uniform and rapid intermixing or mixing of the organic substances is made possible in a sump phase of the reactor.

In a particularly preferred embodiment of the invention, the pneumatic means has at least one container, which is lined at least partially with a gas-permeable material. The lining with the gas-permeable material provides the prerequisite that the organic material located in the container is uniformly fluidised, so consolidation of the material is reliably avoided. It may be provided, in this case, that the container has a lower region with a tapering cross section, in which a discharge opening is provided, at least the lower region being lined with the gas-permeable material. The fluidising effect of the gas-permeable material is thus increased. At least one gas supply arrangement is preferably located in the region of the gas-permeable material in the container in such a way that gas supplied during operation enters the container through the material. The fluidisation aimed for of the material located in the container is thus achieved in a particularly simple manner. Moreover, an undesired adhesion of the solid bodies to the container wall and clogging of the supply opening of the pressurised conveying container are avoided by the gas-permeable material.

In this case, a further gas supply arrangement can open into the container outside the gas-permeable material. This further gas supply arrangement can be used to supply a transport gas. In this context it is particularly advantageous if the further gas supply arrangement opens in the region of the discharge opening into the container, so the transport gas flow is used there in a targeted manner where it is particularly effective.

The container is preferably at least partially coated with a high temperature-resistant anti-adhesion material, thus further reducing the risk of bridge building in the container. The device may be adapted for operation at absolute operating pressures of 0.5 to 200 bar.

The invention will be described more closely below with the aid of embodiments with reference to the accompanying schematic drawings with further details. In the drawings FIG. 1 shows a cross section through a pneumatic solid material supply arrangement in a schematic view according to an embodiment of the invention;

Figure 1:
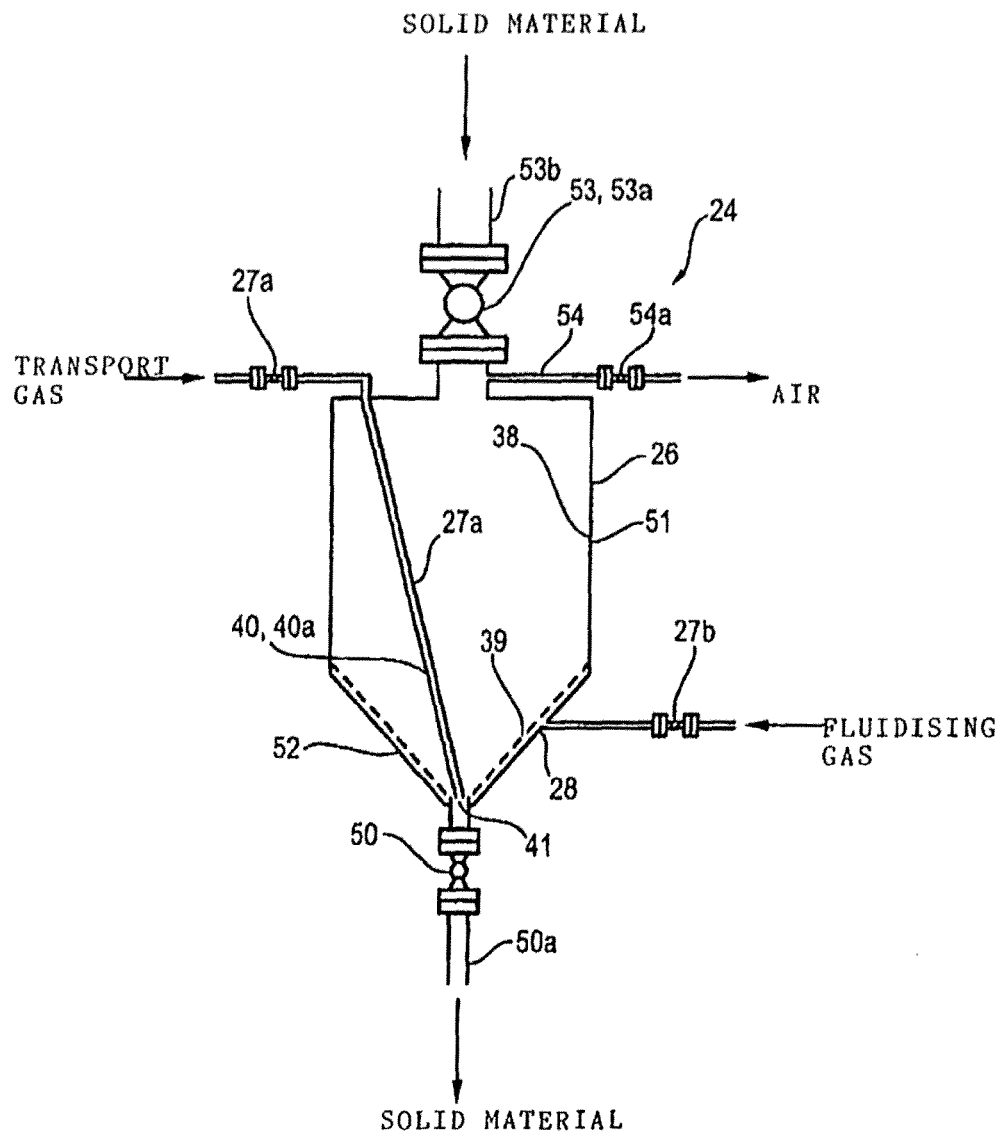

FIG. 1 shows a cross section of an embodiment of a pneumatic means 24 to supply solid materials, which is used as a feed arrangement 11 for a reactor 10 for producing starting materials, combustibles and fuels from organic substances.

Figure 4:
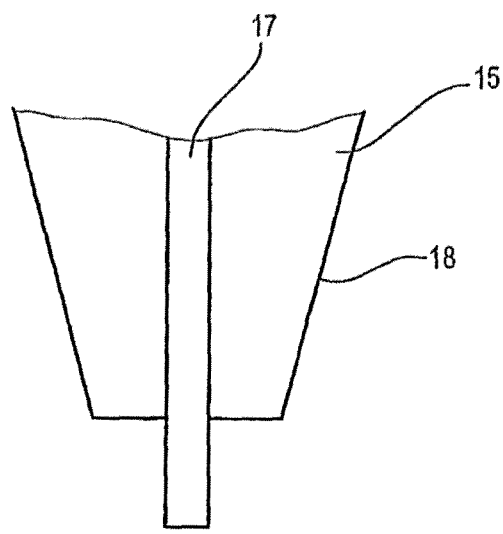
FIG. 4 shows a detailed view of the propulsion jet nozzle of the reactor according to FIG. 1.

The pneumatic means 24 has a container, in particular a pressurised conveying container 26, which can be connected by a valve arrangement, for example by an outlet ball valve 50 to the reactor 10 or to a propulsion jet nozzle 15. Instead of the outlet ball valve 50, other types of valves can be used. The pressurised conveying container 26 comprises an upper cylindrical portion 51 and a lower conical portion 52. A supply device 53, for example with a filling ball valve 53a, is provided to supply the solid materials. The filling with organic substances is indicated in FIG. 4 by a corresponding arrow. Arranged downstream of the supply device 53 is a waste gas line 54, through which displaced air can escape.

The pressurised conveying container 26 is connected to a pressure gas arrangement, by which a fluidising gas and a transport gas are supplied. The pressure gas arrangement is connected to a gas supply arrangement 27a for transport gas (transport gas supply arrangement). The transport gas supply arrangement 27a comprises a supply means 40, for example in the form of a lance 40a, which opens in the region of the discharge opening 41 of the conveying container 26. The feeding of the transport gas is thereby achieved in a targeted manner at the point where the solid material is discharged from the pressurised conveying container 26.

Furthermore, a further gas supply arrangement 27b is provided for the fluidising gas (fluidising gas supply arrangement), which is connected to the pressure gas arrangement and has a supply opening 28, which is arranged in the lower conical portion 52 of the pressurised conveying container 26. This achieves a particularly efficient fluidisation of the solid materials located in the pressurised conveying container 26. The lower conical portion 52 is coated or lined with a gas-permeable material 39 which is arranged at least in the region of the supply opening 28 of the fluidising gas supply arrangement 27b. The entire lower conical portion 52 is lined in the pressurised conveying container 26 according to FIG. 1. The gas-permeable material 39 therefore forms a porous ventilating cone, which assists a homogeneous fluidisation of the solid materials. The gas-permeable material 39 also prevents consolidation of the crushed solid materials in the pressurised conveying container 26. The upper cylindrical portion 51 is also coated, for this purpose, with a high temperature-resistant anti-adhesion coating 38. The gas-permeable material 39 is open in the region of the discharge opening 41.

The pressurised conveying container 26 according to FIG. 1 is operated as follows:

The crushed solid materials are passed with the filling ball valve 53a open and the exhaust gas ball valve 54a open by means of a suitable transport device through the filling line 53b into the pressurised conveying container 26. The air thus displaced escapes via the waste gas line 54. When the pressurised conveying container 26 is filled, the filling ball valve 53a closes and inert gas firstly flows through the fluidising gas supply arrangement 27b into the pressurised conveying container 26. After the inertisation of the pressurised conveying container 26 has taken place, the waste gas ball valve 54a is closed and the pressurised conveying container 26 is brought optionally with inert or reaction gas to operating pressure by the transport gas supply arrangement and/or fluidising gas supply arrangement 27a, 27b. On reaching the operating pressure, the outlet ball valve 50 opens and transport gas is blasted through the lance 40a of the transport gas arrangement 27a in the region of the feed opening 41. The solid material located in the pressurised conveying container 26 together with the reaction gas is thereby transported through the drainage line 50a to the reactor 10 of the propulsion jet nozzle 15.

The solid material is discharged in a metered manner from the pressurised conveying container 26 by a targeted adjustment of the ratio of fluidising gas to transport gas.

Figure 2:
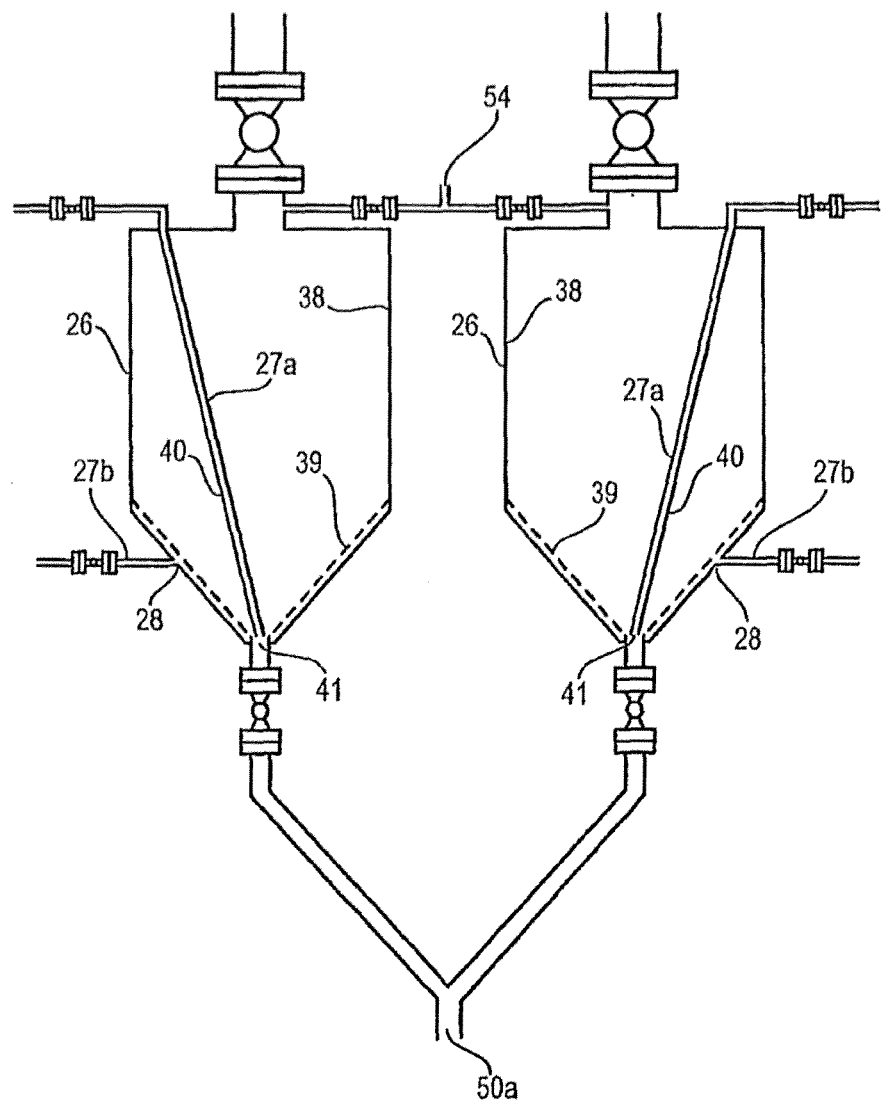
FIG. 2 shows a combination of two solid material supply arrangements according to FIG. 1.

A continuous operation of the pneumatic means 24 can be achieved by interconnecting at least two or more pressurised conveying containers 26, as shown in FIG. 2. The two pressurised conveying containers 26 have a common exhaust gas line 54 and a common drainage line 50a. By selective operation of the two pressurised conveying containers 26, one, in each case, of the two containers acts as a storage container, while the solid material is conveyed by means of the respective other container. As soon as this container is empty or virtually empty, a switch is made to the other container which has been filled in the meantime. The pressurised conveying container 26 acting as a storage container is thus used as an intermediate store (buffer container) and simultaneously as a pressure sluice between the atmospheric pressure and the required conveying or system pressure. The pressurised conveying containers 26 or storage containers are filled by means of a suitable external conveyor arrangement with solid materials originating from an external store and then loaded with gas after closing the solid material supply to render inert and to build up the required system pressure. This preferably takes place with process gas, which is branched off from the conveyor gas flow. The build-up of the required system pressure may, however, also take place with externally supplied gas. Once the pressure build-up and the inertisation are complete, the valve-controlled sluice and line system to the reactor 10 is opened and the solid materials together with carrier gas or transport gas, which may also contain the reaction gas, are introduced into the reactor.

While a storage container ensures the supply of solid material and gas into the reactor (pressurised conveying container 26), the other storage container is filled with the next solid material charge. The respective storage container is relieved of pressure before refilling.

Overall, the pneumatic conveyance through the technical adaptation, which has taken place in the embodiment according to FIG. 2, to increased pressures up to 200 bar and temperatures to 300° C. represents an optimum device for feeding organic solid materials into sump phases for the purpose of direct liquefaction. The solid material particles are fed rapidly and directly into the pressure reactor in the liquid sump phase thereof, without being compacted in the process. Moreover, the solid materials are free of auxiliary ballast materials, such as slurry liquid, so the solid materials in the sump phase can be heated very rapidly and with as low an energy expenditure as possible to a reaction temperature in the order of magnitude of about 200 to 600° C. As a result, a particularly energy-efficient conduct of the process and a high yield of the desired liquid product can be achieved. The solid carbonisation and tarring products occurring to an increased extent during slow heating are substantially avoided.

The pneumatic feed arrangement 11 according to FIGS. 1 and 2 can be combined with different types of reactors, for example with a stirred tank reactor or a tubular reactor, in which built-in components, for example static mixers, are provided. The pneumatic feed arrangement 11 is particularly preferred for use with a loop reactor or in general with a reactor, which comprises an arrangement 14 for forming a circulating flow internal to the reactor. The pneumatic means 24 of the feed arrangement 11 is associated here with the arrangement 14 for forming the circulation internal to the reactor. The pneumatic means is specifically connected to a propulsion jet nozzle 15, in particular to a nozzle pipe 17 of the propulsion jet nozzle 15 arranged internally. An example of a loop reactor of this type is shown in FIG. 3.

Figure 3:
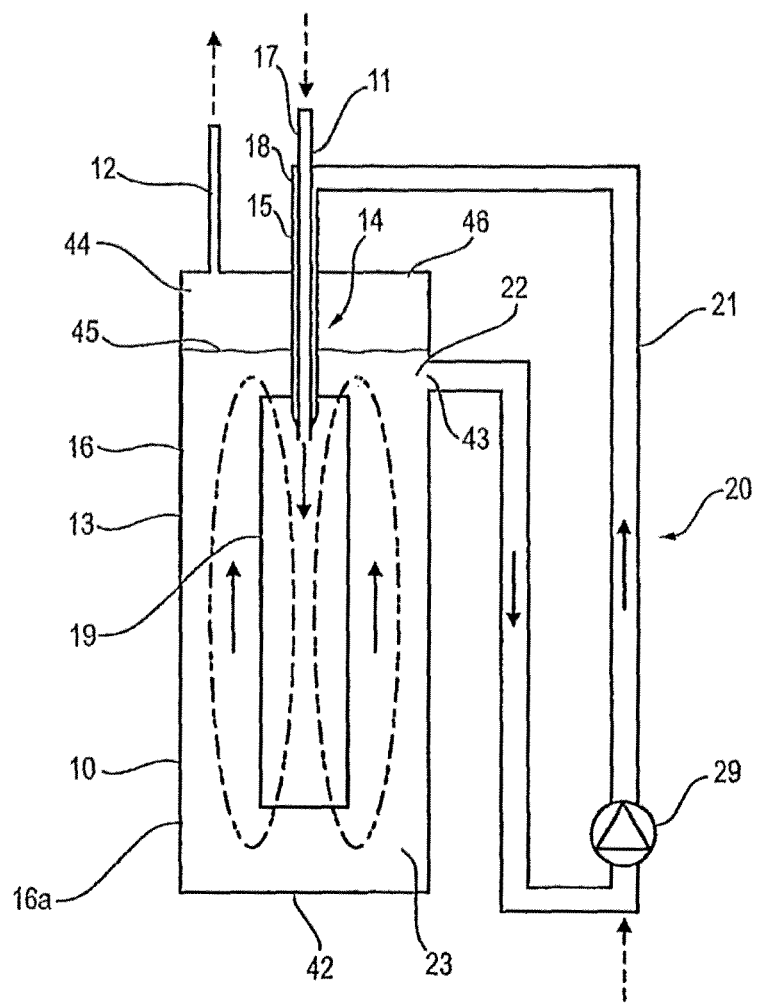
FIG. 3 shows a cross section through a reactor for producing starting materials, combustibles and fuels from organic substances.

FIG. 3 shows a cross section of a reactor 10, which is used to produce starting materials, combustibles and fuels from organic substances by means of direct liquefaction. In this case, a multi-phase mixing reactor, in fact a loop reactor, is used.

The reactor 10 comprises a housing 16 with a vertically arranged cylindrical casing 16a. Provided at the upper axial end of the reactor is a feed arrangement 11, by means of which the organic substances are conveyed into the reactor 10. Furthermore, arranged at the upper axial end of the reactor 10 is a discharge arrangement 12 for reaction products, for example highly volatile hydrocarbon compounds, which, for example, is connected to a distillation column (not shown). Heating elements, which form the arrangement 13 to supply reaction energy, are integrated in the cylindrical casing 16a. The heating elements may be configured for thermal or inductive heating or for heating by means of microwaves. The arrangement 13 may additionally comprise means for pressure loading of the reactor, so both pressureless and pressure-loaded operation of the reactor 10 is possible.

The reactor 10 further comprises an arrangement 14 for forming a circulating flow internal to the reactor with at least one propulsion jet nozzle 15, which opens in the upper region of the reactor 10 into the housing 16. The propulsion jet nozzle 15 is configured as a double-pipe nozzle or as a three-material nozzle and has two concentrically arranged nozzle pipes 17, 18.

FIG. 4 shows a detailed view of the discharge region of the propulsion jet nozzle 15 with the two nozzle pipes 17, 18. It can be seen there that the inner pipe 17 projects axially over the outer pipe 18, an annular gap being formed between the inner pipe 17 and the outer pipe 18. This means that medium can be transported into the reactor 10 through the inner pipe and through the outer pipe. The inner nozzle pipe 17 preferably projects from the nozzle outlet cross section by 0.4-6 times the nozzle diameter, i.e. the outlet diameter of the outer nozzle pipe 18. The ratio of the diameter of the inner nozzle pipe 17 to the diameter of the outer nozzle pipe 18 in the region of the outlet opening of the propulsion jet nozzle 15 is between 0.4 and 0.9.

The inner pipe 17 is connected to a solid material supply, not shown in FIG. 3, in particular a pneumatic solid material supply. The outer pipe 18 is connected to a return line or a circulation line 21, in general with an arrangement 20 for forming a circulation external to the reactor. A guide pipe 19 or a flow guide pipe is associated with the propulsion jet nozzle 15, the guide pipe 19 and the propulsion jet nozzle 15 being arranged aligned. As can be seen in FIG. 3, the outlet side of the propulsion jet nozzle 15 may project into the guide pipe, so, in this region, the guide pipe 19 concentrically surrounds the propulsion jet nozzle 15. An intermediate space is provided between the lower edge of the guide pipe 19 and a housing base 42 of the reactor 10. The guide pipe 19 is open at the two axial ends and, together with the propulsion jet nozzle 15, forms part of the arrangement 14 for forming the circulating flow internal to the reactor. The ratio of the diameter of the external casing 16a to that of the flow guide pipe 19 is preferably 3:1 to 5:1.

The arrangement 20 for forming the circulation external to the reactor comprises the circulation line 21 which connects two portions 22, 23 of the reactor 10 spaced apart from one another. The arrangement 20 for forming the circulation external to the reactor may be equipped with heating elements and/or a filter element. Specifically, the circulation line 21 connects a portion arranged in the upper region of the reactor 10 to the axial upper end of the reactor 10, so a circulation external to the reactor is formed. In this case, the circulation line 21 connects a region of the reactor 10, in which a sump oil-biomass-stripping gas mixture is located, to the propulsion jet nozzle 15. As can be seen in FIG. 3, the circulation line 21 in this case forms the outer nozzle pipe 18 of the propulsion jet nozzle 15. To circulate the sump oil in the circulation external to the reactor, a pump 29 is provided, which is suitable for conveying a solid material load. The organic substances may, in addition to the pneumatic solid material supply, be fed mechanically, a mechanical means 15 suitable for this being arranged, for the supply of solid material, either upstream or downstream of the pump 29 in the conveying direction. The mechanical feeding of the organic substances into the circulation external to the reactor is indicated by a dashed arrow in FIG. 3, which is arranged upstream of the pump 29 in the conveying direction.

The circulation line 21, at the point where the circulation line 21 opens into the reactor 10, forms a sump oil discharge 43. This sump oil discharge 43 is spaced so far apart from the axial upper end of the reactor 10 that a liquid level is adjusted over the sump oil discharge 43 and a gas collecting space 44 is formed between the liquid level 45 and the upper axial end 46 of the reactor. The mouth of the propulsion jet nozzle 15 is arranged, in the axial direction, below the sump oil discharge 43, but is at least arranged such that it is ensured during operation of the reactor 10 that the mouth of the propulsion jet nozzle 15 is located below the liquid level 45. Specifically, the propulsion jet nozzle 15 is arranged in such a way that a liquid level 45 is adjusted, which is approximately at a level corresponding to 0.4 to 1.5 times the diameter of the flow guide pipe 19 above the upper axial end of the flow guide pipe 19.

The mode of functioning of the reactor 10 according to FIG. 3 is explained as follows.

Biomass is fed pneumatically to the propulsion jet nozzle 15 by means of reaction/stripping gas through the inner nozzle pipe 17. At the same time, sump oil is fed to the outer nozzle pipe 18 of the propulsion jet nozzle 15 through the circulation line 21. The stream of sump oil issuing from the propulsion jet nozzle 15 sucks up the reaction/stripping gas guided in the low pressure region of the propulsion jet nozzle 15 via the centrally arranged inner nozzle pipe 17 leaving the nozzle outlet cross section radially open, thereby achieving an extremely fine distribution of the gas bubbles. The gas bubbles are mixed intensively with the biomass and the sump oil. Therefore, the reactor 10 is operated both with a free internal circulating flow, i.e. without the aid of mechanically moving component parts, which is started by the injection of a propulsive medium, for example the sump oil from the reactor 10 through the propulsion jet nozzle 15, and with an external circulation which is guided through the circulation line 21 and is driven by the pump 29.

The reactor 10 according to FIG. 3 ensures an unexpectedly optimum mixing behaviour of the three phases of gas, liquid and solid. At the same time, the reactor circulation ensures a production-oriented residence time control with a discharge of the readily volatile target products and a selective sluicing out of solids from the poorly volatile product fraction remaining in the reactor circuit. The solid starting materials and auxiliaries are introduced by feed arrangements which are capable of being fed as continuously as possible into a reactor system which is under high excess pressure. In this respect, the solids are fed pneumatically together with a reaction gas or an inert carrier gas directly into the optimum mixing and reaction zone of the reactor. The reactor 10 is preferably configured as a loop mixer with an integrated phase separation, without mechanically moving elements and with both a circulation inside the reactor and a circulation outside the reactor. Thus, a surprisingly ideal product-oriented mixing and reaction result is obtained. The external reactor circulation is driven hydraulically by the circulation pump 29 which is suitable for the solids load and gas load and which also drives the internal reactor circulation via the propulsion jet nozzle 15. Furthermore, if required, suspensions with catalysts or auxiliaries can be fed into the reactor circuit by a pump.

Figure 5:
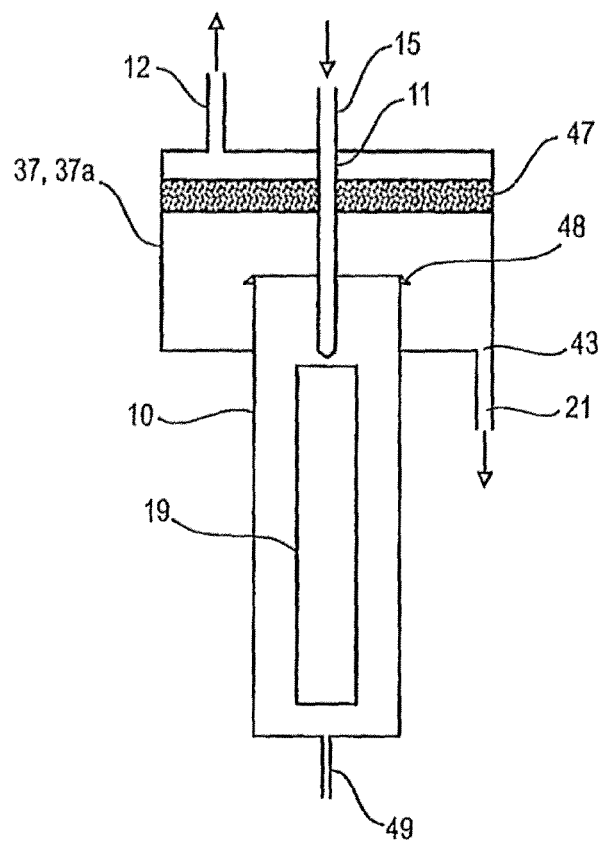
FIG. 5 shows another embodiment of a reactor for producing starting materials, combustibles and fuels from organic substances.

A further embodiment of a reactor 10 is shown in FIG. 5. The reactor 10 in FIG. 5 is constructed similarly to the reactor 10 according to FIG. 5 and also comprises a degassing arrangement 37, specifically a degassing head 37a for an improved gas-liquid separation. The degassing head 37a is arranged between the reactor 10 and the discharge arrangement 12 for the readily volatile hydrocarbon compounds. As can be seen in FIG. 5, the degassing head 37a engages over the reactor 10. The discharge arrangement 12 for the reaction products is provided on the degassing head 37a, as is the sump oil discharge 43 which connects the degassing head 37a to the circulation line 21. In FIG. 3, only part of the circulation line 21 has been shown. The arrangement of the circulation line 21, in particular the connection with the propulsion jet nozzle 15 corresponds to the arrangement of FIG. 3.

The degassing head 37a comprises a droplet collector 47 which is arranged below, that is, upstream of the discharge arrangement 12 for the readily volatile hydrocarbon compounds and extends over the cross section of the degassing head 37a. The droplet collector 47 is provided for the retention of aerosols and is adapted accordingly. Provided in addition to the droplet collector 47 is a drip ring 48 which is mounted on or formed integrally with the outer edge of the upper axial end of the reactor 10.

Furthermore, according to FIG. 5, a drainage line 49 is provided on the housing base 42 of the reactor 10. This drainage line 49 can also be provided in the reactor according to FIG. 3.

The reactor 10 according to FIG. 5 is operated in a similar manner to the reactor 10 of FIG. 3. In this respect, reference is made to statements in this regard.

The invention also includes embodiments in which more than one propulsion jet nozzle 15, for example two, three, four or even more propulsion jet nozzles 15 are provided. In this respect, a flow guide pipe 19 is associated with each propulsion jet nozzle 15. Alternatively, it is also possible for several propulsion jet nozzles 15 to be associated with one flow guide pipe 19 and, in this case, the flow guide pipe 19 has larger dimensions accordingly. The use of several propulsion jet nozzles 15 allows the adjustment of a correspondingly multiple-loop flow profile in the reactor 10.

The pneumatic feed arrangement 11 is connected by means of the line 50a to the propulsion jet nozzle 15, in particular to the inner pipe 17 of the propulsion jet nozzle 15. It is thus possible to pneumatically feed the organic substances located in the container 26 into the reactor directly into the sump phase so the organic substances are rapidly and uniformly mixed with the sump phase in the reactor. In the case of a plurality of propulsion jet nozzles 15, a corresponding plurality of containers 26 can be provided.

The invention claimed is:

1. A device for producing starting materials, combustibles and fuels from organic substances with a reactor, which has a feed arrangement for the organic substances, a discharge arrangement for reaction products and an arrangement for supplying reaction energy to convert the organic substances into the reaction products, the feed arrangement comprising:
   pneumatic means for the supply of solid material, the pneumatic means comprising a container, wherein the container has a lower region with a tapering cross section, in which a discharge opening is provided, at least the lower region being lined at least partially with the gas-permeable material, and wherein the solid material is fed in fluidised form by the pneumatic means;
   at least one gas supply arrangement which opens in the region of the gas-permeable material into the container such that supplied gas enters the container through the gas-permeable material; and
   a further gas supply arrangement which opens into the container inside the gas-permeable material in the region of the discharge opening.

2. A device according to claim 1, characterised in that the container is at least partially coated with a high temperature-resistant anti-adhesion material.

3. A device according to claim 1, characterised in that the device is adapted to operate at absolute operating pressures of 0.5 to 200 bar.

4. A device according to claim 1, wherein the pneumatic means comprises a pressurized conveying container; and wherein the pressurized conveying container comprises an upper cylindrical portion and a lower conical portion.

5. A device according to claim 4, wherein the pressurized conveying container is connected to a pressure gas arrangement, by which a fluidising gas and a transport gas are supplied.

6. A device according to claim 1, wherein the reactor is a stirred tank reactor.

7. A device according to claim 1, wherein the reactor is a tubular reactor or a loop reactor.

8. A device according to claim 1, wherein the feed arrangement extends into the reactor.

9. A device for producing starting materials, combustibles and fuels from organic substances with a reactor, which has a feed arrangement for the organic substances, a discharge arrangement for reaction products and an arrangement for supplying reaction energy to convert the organic substances into the reaction products, the feed arrangement comprising:
   a pneumatic solid material supply arrangement; having at least one container, which is at least partially lined with a gas-permeable material wherein at least one gas supply arrangement opens in the region of the gas-permeable material into the container in such a way that supplied gas enters the container through the gas-permeable material; wherein a further gas supply arrangement opens into the container outside the gas-permeable material; and wherein the further gas supply arrangement opens in the region of the discharge opening into the container.

10. A device according to claim 9, characterised in that the container is at least partially coated with a high temperature-resistant anti-adhesion material.

* * * * *